(12) United States Patent
Oh et al.

(10) Patent No.: US 6,733,191 B2
(45) Date of Patent: May 11, 2004

(54) LENS CAP ASSEMBLY FOR CAMERA

(75) Inventors: Sang-Hwan Oh, Changwon (KR); Jae-Ho Hwang, Changwon (KR); Sang-Geol Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 10/455,889

(22) Filed: Jun. 6, 2003

(65) Prior Publication Data

US 2004/0042784 A1 Mar. 4, 2004

(30) Foreign Application Priority Data

Aug. 30, 2002 (KR) .................................... 2002-0051966
Apr. 3, 2003 (KR) .................................... 2003-0021001

(51) Int. Cl.$^7$ ............................................. G03B 17/00
(52) U.S. Cl. ..................................... 396/448; 359/511
(58) Field of Search ........................... 396/448; 359/511

(56) References Cited

U.S. PATENT DOCUMENTS 5,434,714 A * 7/1995 Kohmoto et al.
5,486,889 A * 1/1996 Shintani ..................... 396/448

* cited by examiner

Primary Examiner—David M. Gray
(74) Attorney, Agent, or Firm—St. Onge Steward Johnston & Reens LLC

(57) ABSTRACT

A lens cap assembly for a camera includes a front panel disposed proximal to a subject, the front panel being provided with a first optical path and a supporting portion projected toward a film or an image-photographing portion, at least a pair of barriers coupled to the front panel by a hinge for opening and closing the first optical path of the front panel, plural elastic members disposed on the front panel to bias the barriers to an open position, a barrier cover fixed to the front panel to enclose the barriers to prevent the barriers from being deviated from an optical axis, the barrier cover being provided with a second optical path, a driving lever rotatably coupled to the barrier cover, the driving lever being provided with a third optical path and a projection depressing the barriers to a closed position, and a power transmission device for converting a linear motion of the barrel into a rotational motion of the driving lever or for operating a bar in a direction for closing the barriers.

18 Claims, 13 Drawing Sheets

LENS CAP ASSEMBLY FOR CAMERA

CROSS-REFERENCES TO RELATED APPLICATIONS

This application claims priority from Korean Patent Application No. 2002-0051966 filed on Aug. 30, 2002 and No. 2003-0021001 filed on Apr. 3, 2003, in the Korean Intellectual Property Office, the disclosures of which are incorporated herein in their entirety by reference.

BACKGROUND OF THE INVENTION

1. Field Of The Invention

The present invention relates to a lens cap assembly for a camera, and more particularly, to a lens cap assembly that can protect a lens provided on an optical zoom camera or a digital still camera.

2. Description of the Related Art

Generally, an optical zoom camera and/or a digital still camera (hereinafter referred to as a "camera") comprises a lens barrel assembly with a plurality of barrels. A lens cap assembly is coupled to one of the barrels such as a zoom ring to protect the lens employed to the lens barrel assembly.

Such a lens cap assembly is disclosed in U.S. Pat. No. 5,614,973 and Korean unexamined Utility Model No. 1999-013008.

The lens cap assembly disclosed in these references is designed such that it can open and close a barrier when the lens barrel is rotated.

In the conventional lens cap assembly, during the course of power transmission converting a relative reciprocal motion of the lens barrel assembly into a rotational motion, the power transmission efficiency is deteriorated. As a result, an overload may be applied to the camera since high power is applied during the open/close operation of the lens cap, thereby increasing the electric power consumption.

SUMMARY OF THE INVENTION

Therefore, the present invention has been made in an effort to solve the above-described problems.

It is an objective of the present invention to provide a lens cap assembly that can minimize electric power consumption during the course of power transmission while converting reciprocal motion of the barrel into rotation motion of the lens cap assembly by simply modifying the design of the conventional lens cap assembly, thereby improving the reliability of the camera.

To achieve the objectives including the one identified above and others to be ascertainable from the disclosure followed here-after, the lens cap assembly of the present invention provides a front panel disposed proximal to a photographic subject, the front panel being provided with an optical path and a supporting portion projected toward a film or an image-photographing portion; at least a pair of barriers coupled to the front panel by a hinge for opening and closing the optical path of the front panel; plural elastic members disposed adjacent to the front panel to bias the barriers to an open position; a driving lever rotatably coupled to a barrier cover, the driving lever being provided with an optical path and a projection for depressing the barriers to a closed position; and power transmission means for converting a linear motion of the barrel into a rotational motion of the driving lever for closing the barriers.

Preferably, the power transmission means comprises a rotator coupled to the supporting portion of the front panel and being depressably rotatable in accordance with the linear motion of the barrel; a spring bar coupled to the supporting portion to rotate the driving lever in accordance with the rotation of the rotator and having a free end for biasing the driving lever; and a fixing pin for fixing the rotator and the spring bar to the supporting portion.

Preferably, the rotator is provided at its rotational center with an opening to fix the rotator therein with the spring bar arranged thereabout.

The power transmission means may further comprise a washer coupled on the fixing pin so that the spring bar can be restricted from detaching from the supporting portion.

Preferably, the barriers are formed of two pairs cooperating with each other to open and close the optical paths.

According to another aspect, the lens cap assembly of the present invention provides a front panel disposed proximal to a photographic subject, the front panel being provided with an optical path and a supporting portion projected toward a film or an image-photographing portion; at least a pair of barriers coupled to the front panel by a hinge for opening and closing the optical path of the front panel; plural elastic members disposed adjacent to the front panel to bias the barriers to an open position; a driving lever rotatably coupled to a barrier cover, the driving lever being provided with an optical path and a projection for depressing the barriers to a closed position; a rotator for converting a linear motion of the barrel into a rotational motion of the driving lever; a spring bar coupled to the supporting portion to rotate the. driving lever in accordance with the rotation of the rotator and having a free end for biasing the driving lever, and a fixing pin for fixing the rotator and the spring bar to the supporting portion.

According to still another aspect, the lens cap assembly of the present invention provides a front panel disposed proximal to a photographic subject, the front panel being provided with an optical path and a supporting portion projected toward a film or an image-photographing portion; at least a pair of barriers coupled to the front panel by a hinge for opening and closing the optical path of the front panel; plural elastic members disposed adjacent to the front panel to bias the barriers to an open position; a driving lever rotatably coupled to a barrier cover, the driving lever being provided with an optical path and a projection for depressing the barriers to a closed position; and a rotator for converting a linear motion of the barrel into a rotational motion of the driving lever, the rotator including an elastic member that is elastically deformable and operably coupled with the driving lever.

According to still another aspect, the lens cap assembly of the present invention provides a front panel disposed proximal to a photographic subject, the front panel being provided with an optical path and a supporting portion projected toward a film or an image-photographing portion; at least a pair of barriers coupled to the front panel by a hinge for opening and closing the optical path of the front panel; plural elastic members disposed at the front panel to bias the barriers to an open position; a driving lever rotatably coupled to a barrier cover, the driving lever being provided with the optical path and a projection for depressing the barriers to a closed position, the driving lever including an elastic portion; and a rotator contacting the elastic portion of the driving lever to convert a linear motion of the barrel into a rotational motion of the driving lever, the rotator being rotatably coupled to the front panel.

BRIEF DESCRIPTION OF THE DRAWINGS

The accompanying drawings, which are incorporated in and constitute a part of the specification, illustrate embodiments of the invention, and, together with the description, serve to explain the principles of the invention.

DETAILED DESCRIPTION OF THE INVENTION

The present invention is described in more detail hereinafter in conjunction with the accompanying drawings.

Figure 1:
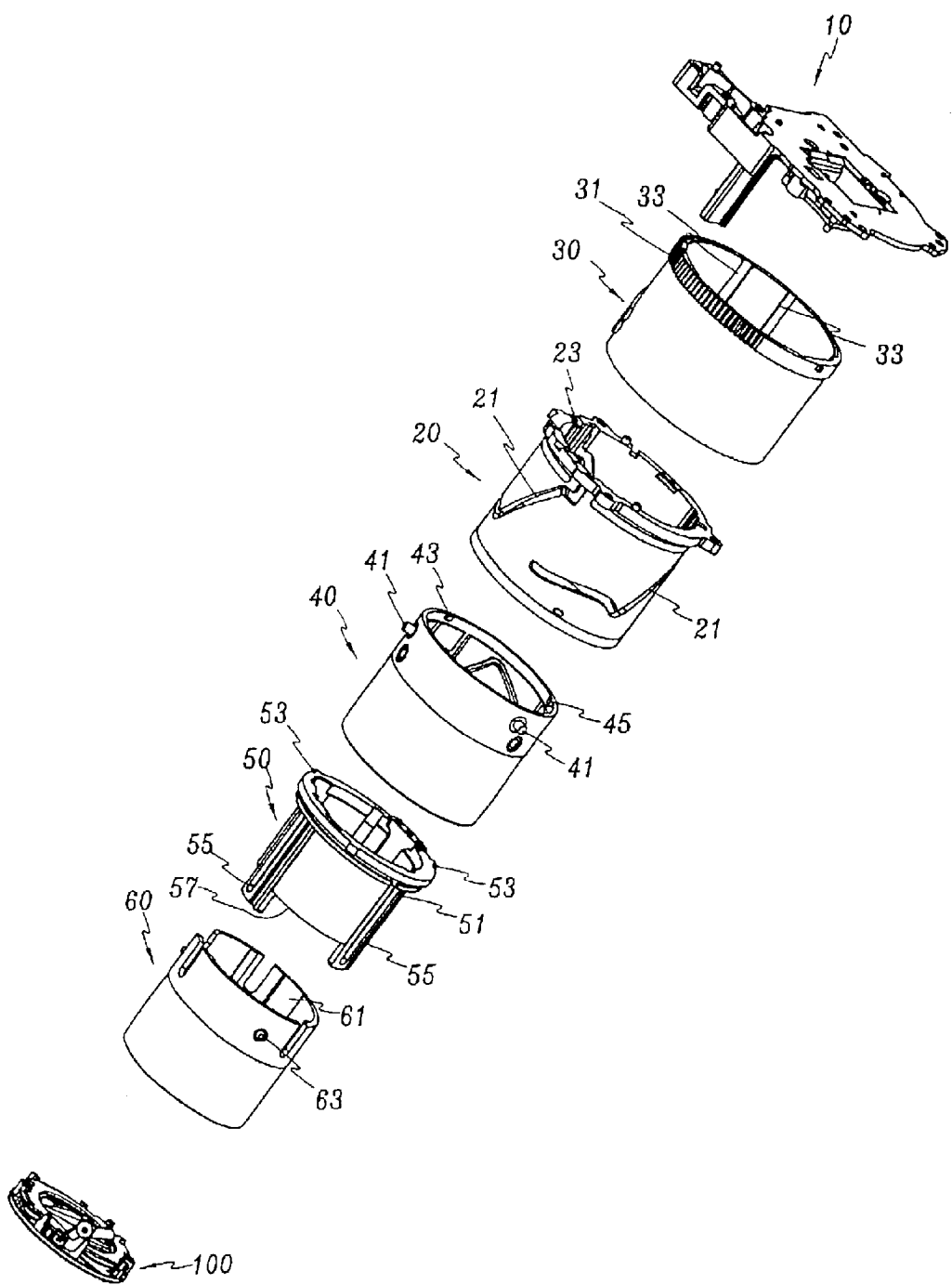
FIG. 1 is an exploded perspective view of a lens barrel assembly and a lens cap assembly according to a first embodiment of the present invention.

FIG. 1 shows a lens barrel assembly and a lens cap assembly for illustrating an embodiment of the present invention.

The inventive lens barrel assembly comprises a lens base 10 coupled to a camera body (not shown), an outer cam barrel 20 fixedly coupled to the lens base 10, an outer guide barrel 30 rotatably disposed on an outer circumference of the outer cam barrel 20, and an inner cam barrel 40, an inner guide barrel 50, and a zoom ring 60, the latter three of which are disposed within the outer cam barrel 20.

The outer cam barrel 20 is provided with a cam channel 21 formed in a predetermined shape such as a generally spiral shape. The outer cam barrel 20 is provided at its inner circumference with plural grooves 23 formed in a direction of the optical axis.

The outer guide barrel 30 is provided at its outer circumferential end with a gear train 31 for receiving a driving force from a motor (not shown) through a reduction gear set (not shown). The outer guide barrel 30 is further provided at its inner circumference with plural grooves 33 formed in the direction of the optical axis. The outer guide barrel 30 is rotatably disposed around the outer circumference of the outer cam barrel 20.

The inner cam barrel 40 is provided at its outer circumference with plural cam projections 41 projected in a radial direction. The cam projections 41 are slidably fitted into the grooves 33 of the outer guide barrel 30. As a result, the inner cam barrel 40 is coupled to both the outer guide barrel 30 and the outer cam barrel 20 such that it can rotate synchronously with the outer guide barrel 30 and move in the direction of the optical axis.

The inner cam barrel 40 is further provided at its inner circumference with a cam groove 43 and plural projections 45 projected in the radial direction.

The inner guide barrel 50 is provided at its outer circumference with a slot 51 in which the projections 45 of the inner cam barrel 40 are inserted. Therefore, the inner guide barrel 50 and the inner cam barrel 40 are coupled to each other to be rotatable with each other. The inner guide barrel 50 is provided at its outer circumference with projections 53 insertable into the grooves 23. Therefore, the inner guide 50 is movable in the direction of the optical axis with respect to the outer cam barrel 20. The inner guide barrel 50 is provided with a guide portion 55 extending in the direction of the optical axis and a contacting portion 57 contacting a rotator which will be described hereinbelow.

The contacting portion 57 provided at the inner guide barrel 50 is illustrated as a front portion of the cylindrical barrel, proximal to the subject.

The zoom ring 60 is provided at its inner circumference with guide slots 61. The guide portion 55 of the inner guide barrel 50 is inserted into the guide slots 61. The zoom ring 60 is further provided at its outer circumference with cam projections 63 insertable into the cam groove 43 of the cam barrel 40. Therefore, the zoom ring 60 is disposed between the inner cam barrel 40 and the inner guide barrel 50 to be movable in the direction of the optical axis.

The inventive lens cap assembly 100 is fixed at a front end of the zoom ring 60, proximal to the subject.

Figure 2:
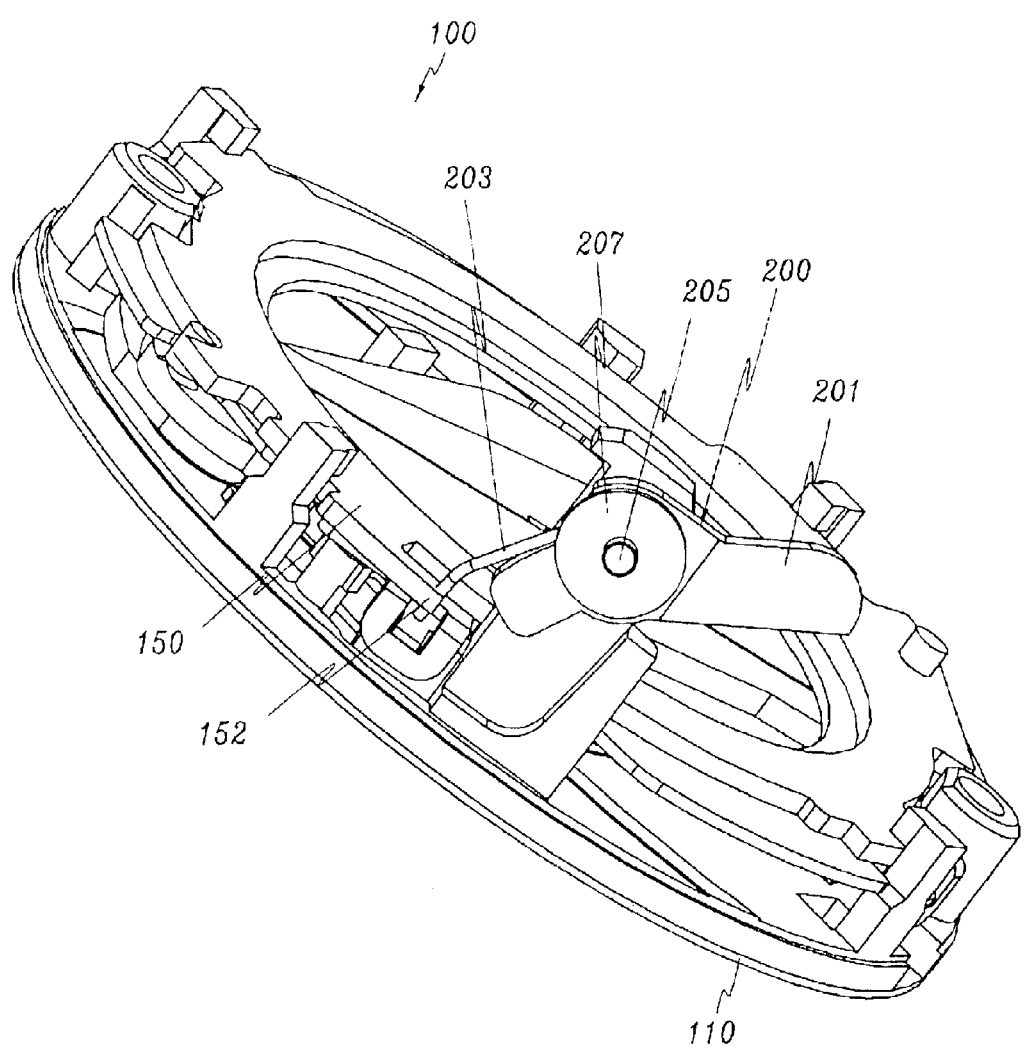
FIG. 2 is a perspective view of the lens cap assembly according to the first embodiment of the present invention.
Figure 3:
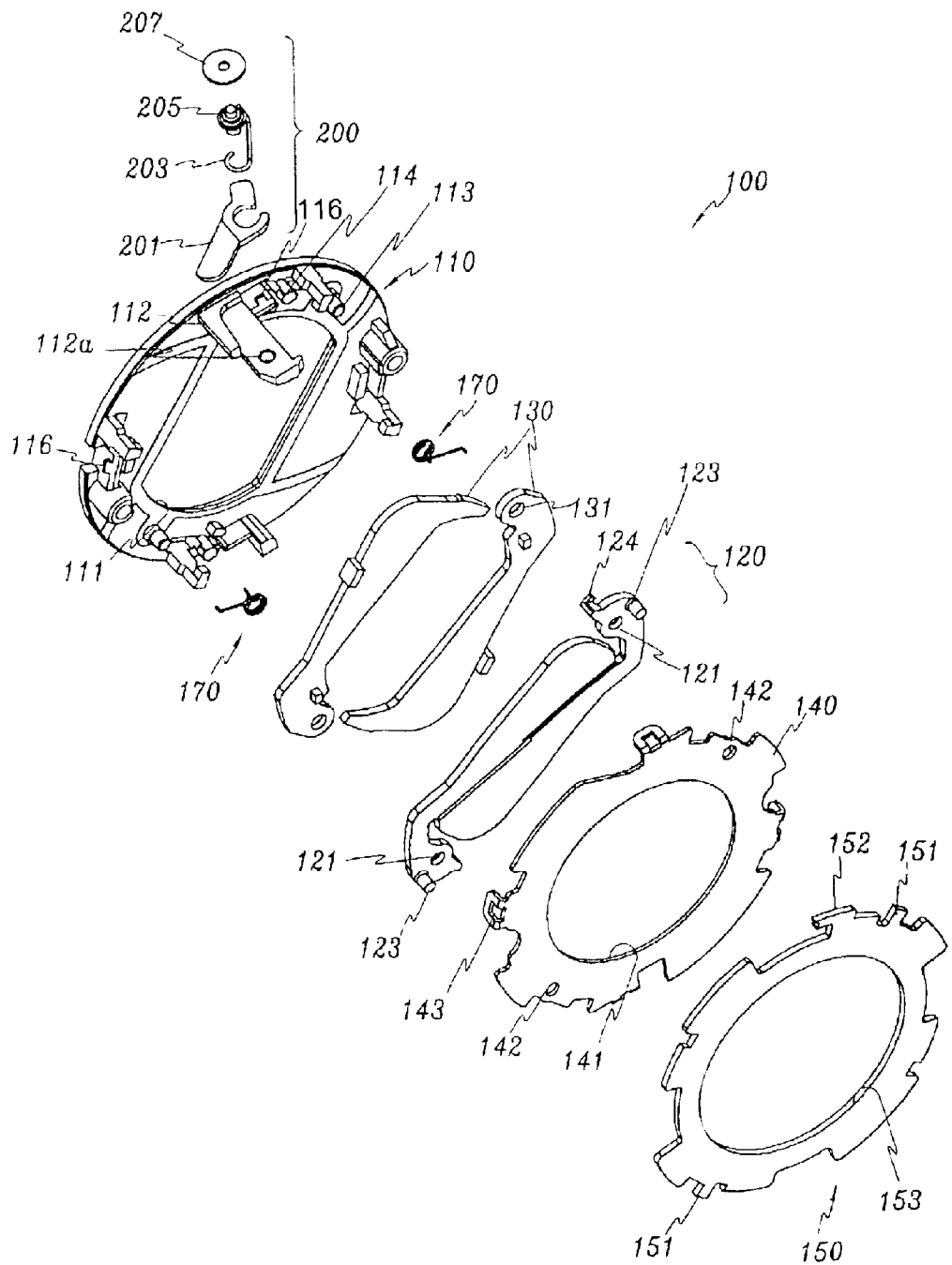
FIG. 3 is an exploded perspective view of the lens cap assembly according to the first embodiment of the present invention.

FIGS. 2 and 3 show the lens cap assembly according to a first embodiment of the present invention.

The lens cap assembly 100 comprises a front panel 110 disposed proximal to the subject and provided at its central portion with an optical path 111, two pairs of first and second barriers 120 and 130 for opening and closing the optical path 111, a barrier cover 140 for fixing the first and second barriers 120 and 130 to prevent the barriers 120 and 130 from being deviated from the optical axis, a rotatable driving lever 150 disposed next to the barrier cover 140, and power transmission means 200 contacting the contacting portion 57 of the inner guide barrel 50 and for maintaining the closed state of the first and second barriers 120 and 130. In addition, there is provided a pair of elastic members 170 supported on the front panel 110 and the first barrier 120 to bias the first and second barriers 120 and 130 in a direction where the first and second barriers 120 and 130 are opened.

The front panel 110 is provided with a supporting portion 112 projected at a rear surface thereof toward a film or a photographing image portion. The supporting portion 112 is provided with a hole 112a penetrating from the circumferential surface toward the optical path. The front panel 110 is provided at its symmetrical portions with pivot shafts 113 projected toward the direction of the optical axis, projections 114 projected to be fitted into the elastic members 170, and a projection 115 projected to support the elastic members 170: The front panel 110 is further provided with hook projections 116 for fixing the barrier cover 140.

The pair of first barriers 120 is provided with holes 121 in which the pivot shaft 113 of the front panel 110 is inserted. Therefore, the pair of first barriers 120 rotates around the hole 121 and the pivot shaft 113 of the front panel to open and close the optical path 111 of the front panel 110.

The pair of first barriers 120 is respectively provided with a pin 123 projected toward the direction of the optical axis. The pin 123 is designed to receive the power of the driving lever 150 so that it can rotate from the open state to the closed state in accordance with the rotation of the driving lever 150. One of the first barriers 120 is provided at its one end with a hook projection 124 to which one end of the elastic member 170 can be hooked.

The pair of second barriers 130 is provided with a hole 131 in which the pivot shaft 113 of the front panel 110 can be inserted. The open/close operation of the second barriers 130 is realized by synchronizing with the first barriers 120. Since the synchronizing operation of the first and second barriers is identical to the conventional one, a detailed description thereof will be omitted herein.

Meanwhile, the elastic member 170 is formed of a torsion spring that is fitted on the projection 114 of the front panel 110. One end of the elastic member 170 is elastically supported by the projection 115 and the other end of the elastic member 170 is elastically supported by the hook projection 124 of the first barrier 120. The elastic member 170 is preferably disposed in a direction where the first and second barriers 120 and 130 are to be opened.

In addition, the barrier cover 140 is provided at its center portion with an optical path 141 and a pivot hole 142 in which the pivot shaft 113 of the front panel 110 is inserted. The barrier cover 140 is further provided at its outer circumference with plural hook grooves 143 in which the hook projections 116 of the front panel 110 are fitted. Therefore, the barrier cover 140 is coupled to the front panel 110 to prevent the first and second barriers 120 and 130 from being deviated from the optical axis when the first and second barriers 120 and 130 open and close the optical path.

The driving lever 150 is provided at its central portion with an optical path 153 and is rotatably disposed on the barrier cover 140. The driving lever 150 is further provided with projections 151 projected in a radial direction and contacting the pins 123 to rotate the first barrier 120. The driving lever 150 is further provided with a projection 152 projected in a radial direction to elastically support the spring bar of the power transmission means.

Figure 4:
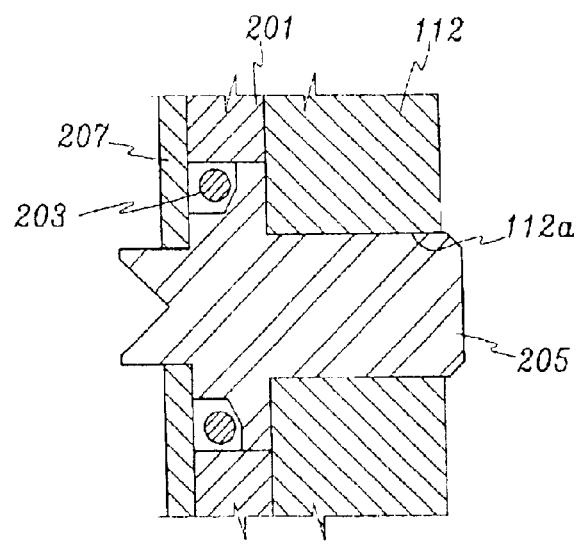
FIG. 4 is a sectional view illustrating a pin according to the first embodiment of the present invention.

The power transmission means 200 for converting the reciprocal motion of the inner guide barrel 50 into the rotational motion of the driving lever 150 is coupled to the front panel 110. That is, the power transmission means 200 comprises a rotator 201 rotatably coupled to the supporting part 112, a spring bar 203 for rotating the driving lever 150 in accordance with the movement of the rotator 201, and a fixing pin 205 for rotatably fixing the rotator 201 and the spring bar 203 on the supporting portion 112 (see FIG. 4).

The rotator 201 is extended such that one end thereof contacts the contacting portion 57 of the inner guide barrel 50. The rotator 201 is provided at its middle portion with a hole in which the fixing pin 205 is inserted within the hole 112a of the front panel. The hole is designed having an open end so that one end of the spring bar 203 closely contacts the projection 152 of the driving lever 105.

The spring bar 203 has a first end coupled to the supporting portion 112 of the front panel by the fixing pin 205 and a second end elastically supported on the projection 152 of the driving lever 150. Therefore, when the barriers are closed to obstruct the optical path, no gap is formed between the barriers by the biasing force of the elastic spring bar 203. That is, the spring bar 203 offsets a gap caused by a processing tolerance and a backlash, thereby allowing the barriers closely contact each other to completely obstruct the optical path.

A washer 207 can be preferably fitted on the fixing pin 205 to prevent the rotator and the spring bar 203 from being detached. Both side ends of the fixing pin 205 may be fixed by caulking in a state where the fixing pin 205 is fitted in the hole 112a provided on the supporting portion 112 of the front panel 110.

When the contacting portion 57 of the inner guide barrel 50 closely contacts the rotator 201, the power transmission means 200 is in a closed state where the first and second barriers 120 and 130 close the optical paths 11 and 141. When the contacting portion 57 is released from the rotator 201, the power transmission means 200 is in an open state where the first and second barriers 120 and 130 open the optical paths 111 and 141.

Figure 5:
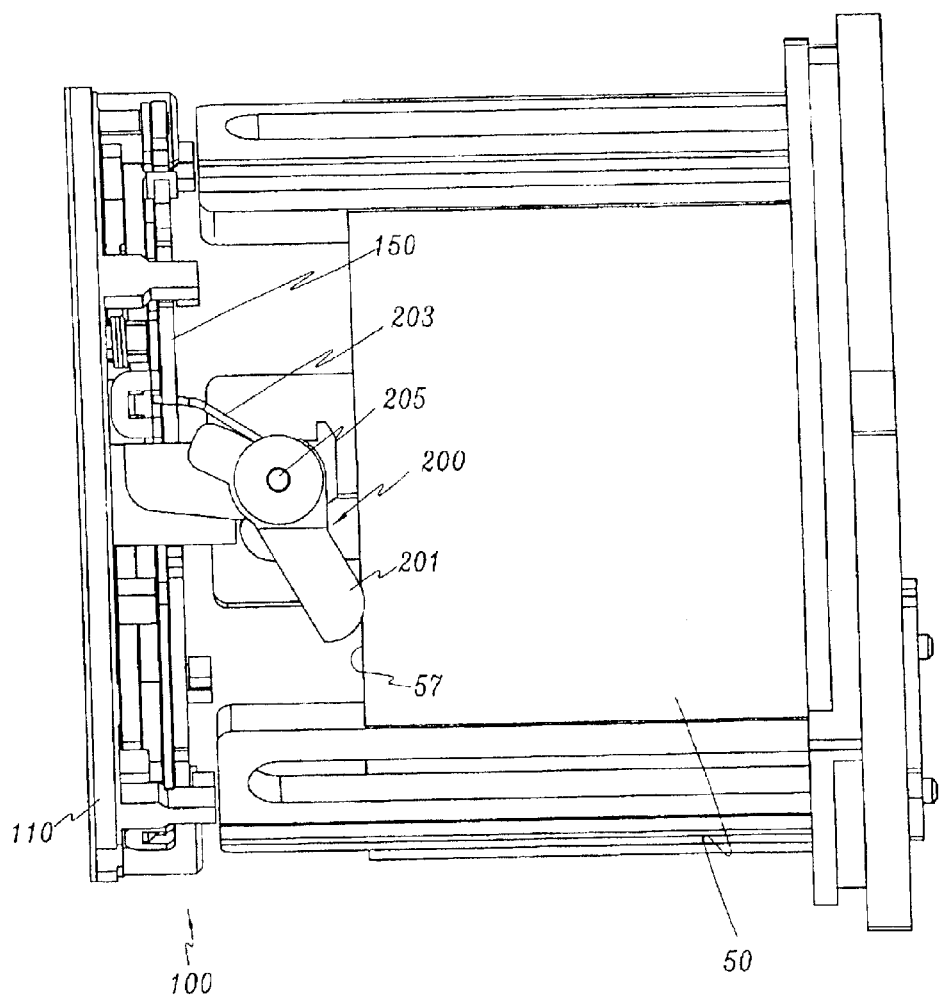
FIG. 5 is a partially sectional view illustrating a part of the lens cap assembly and the lens barrel assembly according to the first embodiment of the present invention.

This operation will be described more in detail hereinafter.,

When the lens barrel assembly is received in the camera, as shown in FIG. 5, the first and second barriers 120 and 130 close the optical paths 111, 141, and 153. That is, the contacting portion 57 of the inner guide barrel 50 is in a state to press (i.e., bias) a portion of the rotator 201. This state is realized when the power of the camera is turned to an off-state to receive the lens barrel assembly in the camera body. From this state, when the power of the camera is turned to an on-state, the first and second barriers 120 and 130 open the optical paths 111, 141, and 153.

Describing the operation in more detail, when the camera is controlled to an on-state, a zoom motor (not shown) is driven to transmit a driving force to the gear train 31 of the outer guide barrel 30 through a reduction gear (not shown). Then, the outer guide barrel 30 rotates relative to the outer cam barrel 20 to rotate and linearly move the inner cam barrel 40 in the direction of the optical axis. That is, the inner cam barrel 40 moves in the direction of the optical axis as the cam projection 41 rotates along the cam channel 21 of the outer cam barrel 20. In addition, the inner guide barrel 50 moves linearly as the projection 53 moves along the groove 23 of the outer cam barrel 20. At this point, the inner guide barrel 50 is not affected by the rotation of the inner cam barrel 40 and moves linearly in the direction of the optical axis. This is possible since the projection 45 of the cam barrel 40 is inserted in the slot 51 of the inner guide barrel 50 and moves relative thereto.

On the other hand, the cam projection 63 of the zoom ring 60 moves in the direction of the optical axis toward the photographic subject along the cam groove 43 of the inner cam barrel 40. At this point, since the lens cap assembly is fixed at the front end of the zoom ring 60, the contacting portion 57 of the inner guide barrel 50 biasing the rotator 201 moves in the direction of the optical axis away from the subject. Therefore, the contacting portion 57 of the inner guide barrel 50 is released from the biasing state of the rotator 201.

As a result, one end of the elastic member 170 functioning as an open spring with one end elastically supported on the projection 115 of the front panel 110 and the other end elastically supported on the hook projection 124 of the first barrier 120 transmits the elastic force to the first barrier 120 to open the optical paths 111, 141, and 153. Therefore, the first barrier 120 opens the optical paths 111, 141, and 153 by the elastic member 170, and the second barrier 130 is synchronized with the first barrier 120 to be opened. At this point, the driving lever 150 rotates in a direction by the pin 123 provided on the first barrier 120.

Figure 6:
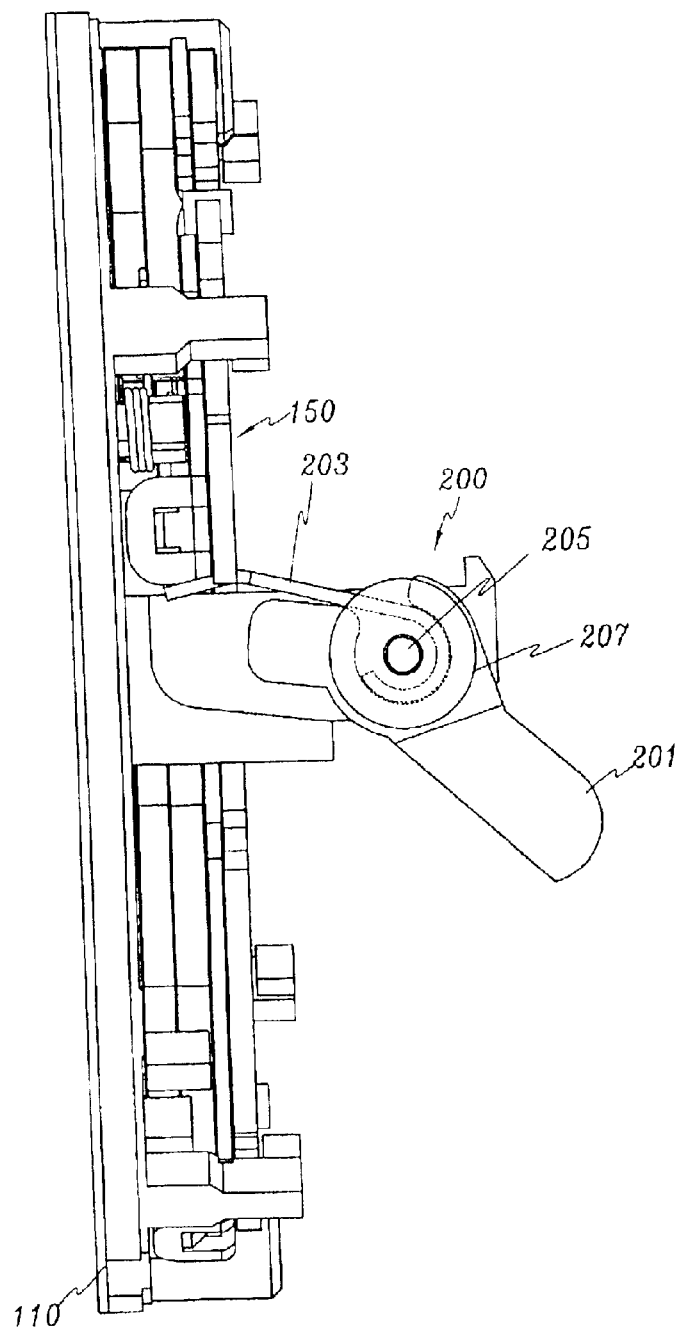
FIG. 6 is a side view illustrating the lens cap assembly according to the first embodiment of the present invention where barriers are opened.
Figure 7:
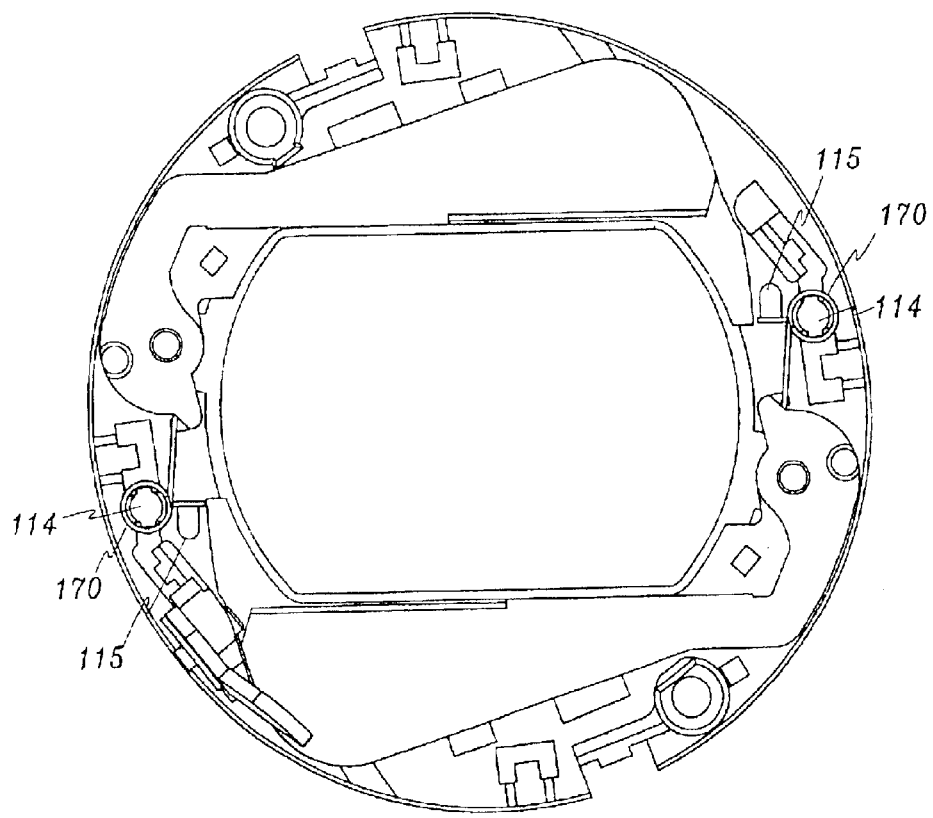
FIG. 7 is a rear view illustrating the lens cap assembly according to the first embodiment of the present invention where barriers are opened.

As a result, the first and second barriers 120 and 130 open the optical paths 111,141, and 153, thereby putting the camera in a photographing mode (see FIGS. 6 and 7).

Figure 8:
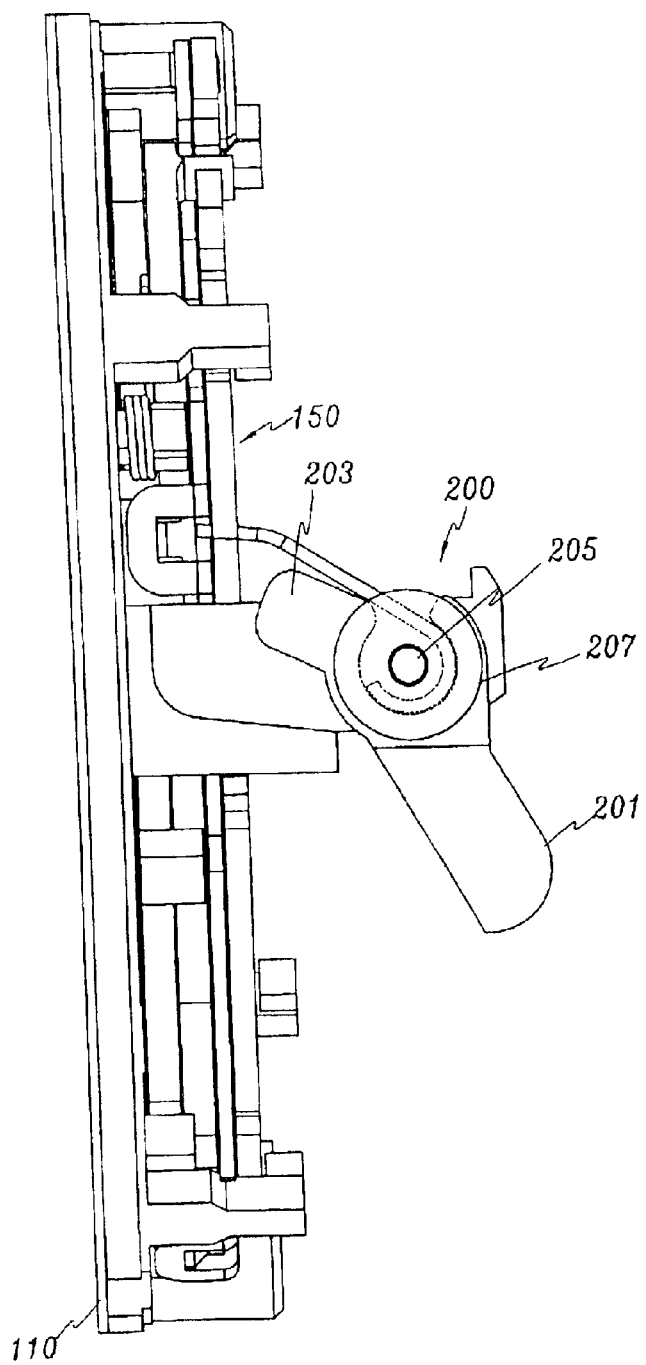
FIG. 8 is a side view illustrating the lens cap assembly according to the first embodiment of the present invention where barriers are closed.
Figure 9:
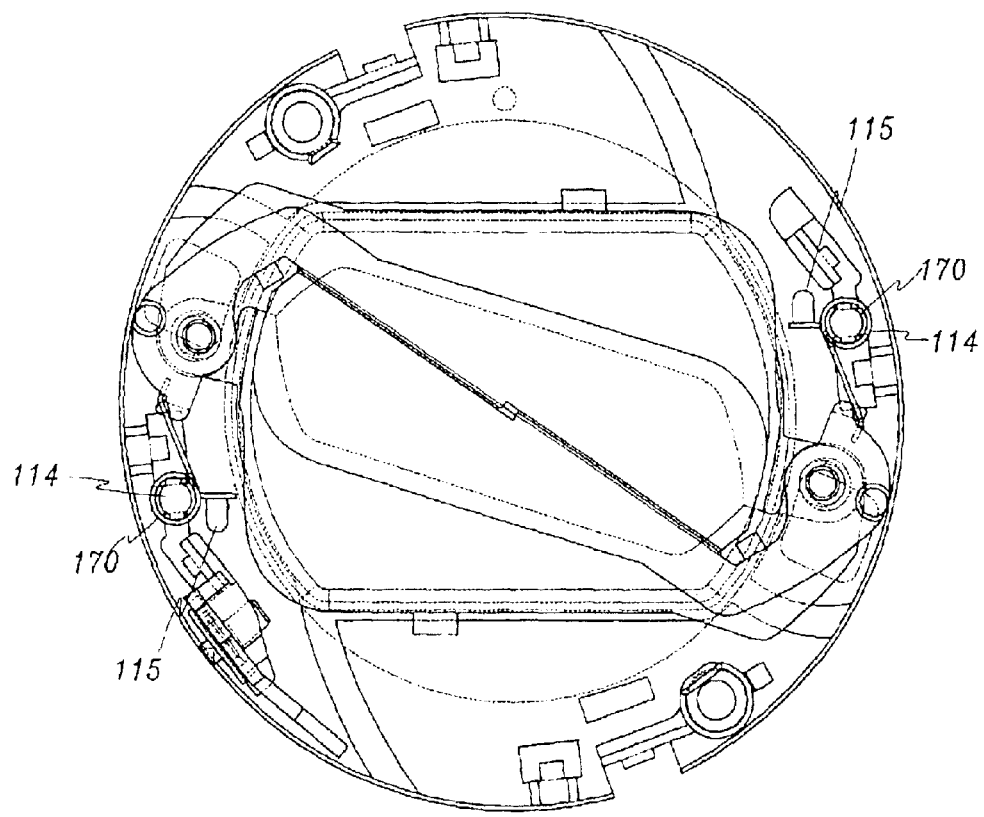
FIG. 9 is a rear view illustrating the lens cap assembly according to the first embodiment of the present invention where barriers are closed.

After photographing is completed, when the camera is controlled to an off-state, the lens barrel assembly is operated in an opposite direction to the above-described photographing mode. That is, the contacting portion 57 of the inner guide barrel 50 depresses the front end of the rotator 201, as a result of which the rotator 201 rotates around the fixing pin 205 to depress the spring bar 203. Then, since the spring bar 203 is elastically supported on the projection 152 of the driving lever 150, the rotational force of the rotator 201 is transmitted to the driving lever 150. Therefore, the driving lever 150 rotates in a close direction where the first and second barriers 120 and 130 close the optical paths 111, 141, and 153. At this point, the projection 151 of the driving lever 150 depresses the pin 123 of the first barrier 120 to rotate the first barrier in a close direction. As a result, the first barrier 120 overcomes the elastic force of the elastic member 170 to rotate in the close direction. Likewise, the second barrier 130 is also rotated in the close direction in response to the rotation of the first barrier 120 (see FIGS. 8 and 9).

As described above, when the barriers are moved in the open direction, the elastic member 170 is operated, and when the barriers are moved in the close direction, one of the barrels, which linearly moves in the direction of the optical axis, depresses the one end of the rotator 201 to rotate it and transmit its rotational force to the spring bar 203, thereby realizing the close operation of the barrier by the rotation of the driving lever 150 caused by the spring force of the spring bar 203.

Figure 10:
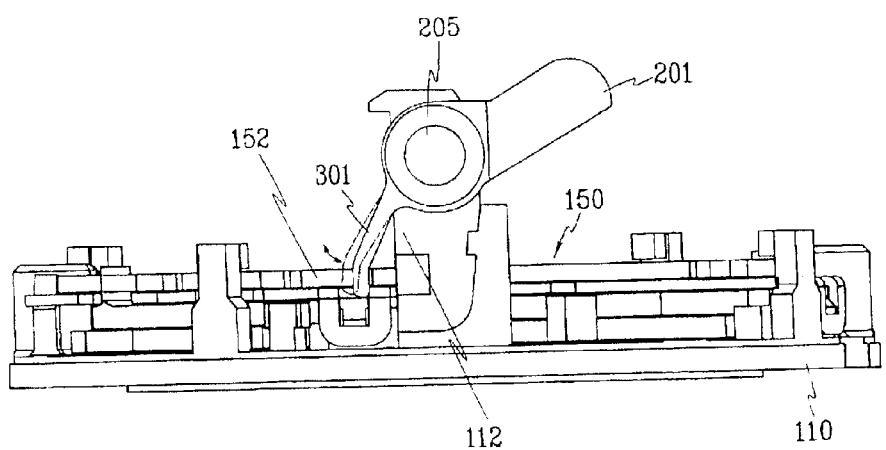
FIG. 10 is a side view illustrating a lens cap assembly according to a second embodiment of the present invention.
Figure 11:
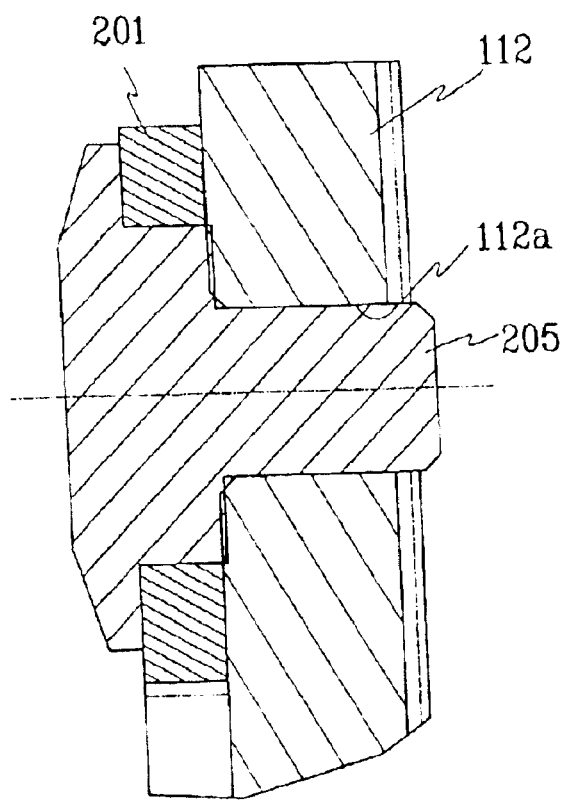
FIG. 11 is a sectional view illustrating the second embodiment similar to FIG. 4 of the first embodiment.

FIG. 10 shows a lens cap assembly according to a second embodiment of the present invention, and FIG. 11 shows a fixing pin depicted in FIG. 10 and a coupling structure of a rotator, in which the rotator is fixed by a front panel 110 and a fixing pin 205. The identical portions to those of the first embodiment will not be specifically described in this embodiment for the clarity.

Power transmission means for converting a reciprocal motion of the inner guide barrel 50 into the rotational motion of the driving lever 150 is coupled on the front panel 110. The power transmission means comprises a rotator 201 having an elastic portion 301 rotatably coupled to a supporting portion 112 extending from the front panel 110 in a direction of the optical axis and designed to be elastically deformable, and a fixing pin 205 allowing the rotator 201 to be rotatably coupled on the supporting portion 112.

The rotator 201 is extended to be contactable on a contacting portion 57 of the inner guide barrel 50 and provided at its middle portion with a hole coupled to the hole 112a provided on the supporting portion 112 of the front panel 110 by the fixing pin 205. That is, the rotator 201 has a first end contactable on the contacting portion 57 and a second end that is an elastic portion 301 elastically supported on a projection 152 of the driving lever 150. In addition, the hole of the rotator 201 is coupled on the hole 112a by the fixing pin 205.

As such, a distinctive feature of this second embodiment is that the rotator 210 is provided with an elastic portion 301. That is, instead of using the spring bar 203 which elastically contacts the projection 152 of the driving lever 150 as in the first embodiment, the one end of the rotator 201 is designed to have such elastic force, i.e., by the elastic portion 301 in this embodiment. By modifying one end of the rotator 201 to the elastic portion 301, the number of parts can be reduced, thereby saving the manufacturing cost and simplifying the structure, The rotator 201 of this embodiment can be formed of synthetic resin, more preferably, of metal. In addition, the elastic deformation of the rotator 201 is incurred at a predetermined range so that it can do the identical function to that of the spring bar 203 of the first embodiment.

Furthermore, as in the first embodiment, when the contacting portion 57 of the inner guide barrel 50 closely contacts the rotator 201, the first and second barriers 120 and 130 are closed to obstruct the optical paths 111, 141 and 153. When the contacting portion 57 of the inner guide barrel 50 is released from the rotator 201, the first and second barriers 120 and 130 are opened by the elastic member 170 functioning as an open spring, thereby opening the optical paths 111, 141 and 153.

Figure 12:
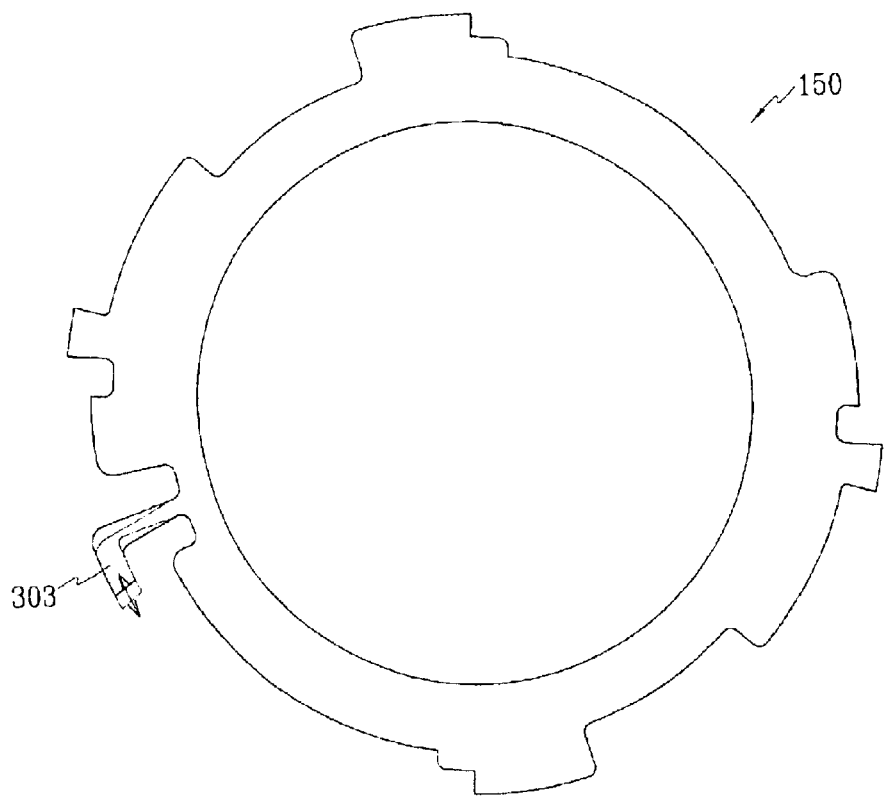
FIG. 12 is a front view of a driving lever according to a third embodiment of the present invention.
Figure 13:
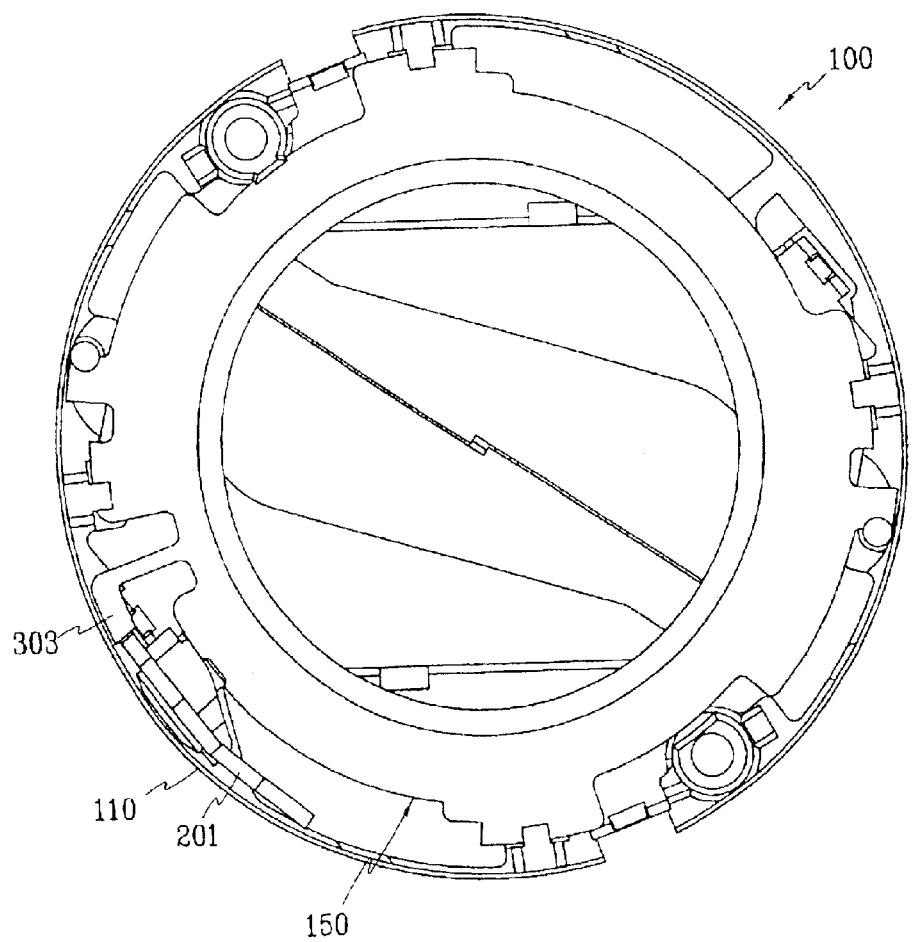
FIG. 13 is a front view of a lens cap assembly according to the third embodiment of the present invention.

FIG. 12 shows a driving lever in accordance with a third embodiment of the present invention, and FIG. 13 shows a lens cap assembly to which the driving lever is coupled.

The driving lever 150 is provided at its one portion contacting the rotator 201 with an elastic portion 303 that can be temporarily elastically deformed. That is, in this third embodiment, the rotator 201 is identical to that of the first embodiment. However, the spring bar 203 is also omitted in this embodiment by providing the elastic portion 303 on the driving lever 150.

As shown in FIG. 13, a portion of the driving lever is designed to be elastically deformed when contacting the rotator 201. That is, the portion becomes the elastic portion 303 functioning as the spring bar 203 of the first embodiment. This embodiment also reduces the number of parts, saving the manufacturing costs and simplifying the structure.

The driving lever 150 of this embodiment can be formed of synthetic resin, more preferably, of metal. In addition, the elastic deformation of the elastic portion 303 is incurred at a predetermined range so that it can do the identical function to that of the spring bar 203 of the first embodiment.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

For example, the lens cap can be opened/closed by a bar disposed on the lens base 10 in the direction of the optical axis, instead of utilizing the above-identified members disposed on the lens barrel.

Furthermore, in the all of the above embodiments, the rotator 201 is rotatably coupled on the supporting portion 112 of the front panel by the fixing pin 205. However, the present invention is not limited to this. For example, a projection functioning as a rotational shaft may be formed on the rotator 201. The projection can be fitted in the hole 112a of the supporting portion 112 provided on the front panel. That is, the rotator 201 and the fixing pin 205 may be integrally formed.

What is claimed is:

1. A lens cap assembly for use with a lens barrel assembly of a camera having a lens barrel, the lens cap assembly comprising:
   a front panel disposed proximal to a photographic subject, the front panel defining an optical path and including a supporting portion projected toward a film or an image-photographing portion;
   at least a pair of barriers disposed adjacent to the front panel and adapted for opening and closing the optical path of the front panel;
   plural elastic members disposed adjacent to the front panel to bias the barriers to an open position;

a driving lever rotatably coupled relative to the front panel and including a projection for depressing the barriers to a closed position; and power transmission means including a rotator coupled to the supporting portion of the front panel, the rotator being rotatable in accordance with a linear motion of the barrel for converting a the linear motion of the barrel into a rotational motion of the driving lever for closing the barriers.

2. The lens cap assembly of claim 1, further comprising a barrier cover is fixed to the front panel and at least partially enclosing the barriers to prevent the barriers from being deviated from an optical axis of the lens barrel, the barrier cover defining an optical path.

3. The lens cap assembly of claim 1, wherein the power transmission means further comprises:

a spring bar coupled to the supporting portion to rotate the driving lever in accordance with the rotation of the rotator and having a free end for biasing the driving lever; and a fixing pin for fixing the rotator and the spring bar to the supporting portion.

4. The lens cap assembly of claim 3, wherein the supporting portion of the front panel portion of the front panel includes an opening to fix the rotator thereto with the spring bar arranged thereabout.

5. The lens cap assembly of claim 3, wherein the power transmission means further comprises a washer coupled to the fixing pin so that the spring bar can be restricted from detaching from the supporting portion.

6. The lens cap assembly of claim 1, wherein the barriers are formed as two pairs cooperating with each other to open and close the optical paths.

7. The lens cap assembly of claim 1, wherein the barriers are coupled to the front panel by a hinge.

8. A lens cap assembly for use with a lens barrel assembly of a camera having a lens barrel, the lens cap assembly comprising:

a front panel disposed proximal to a photographic subject, the front panel defining an optical path and including a supporting portion projected toward a film or an image-photographing portion;

at least a pair of barriers disposed adjacent to the front panel for opening and closing the optical path of the front panel;

plural elastic members disposed adjacent to the front panel to bias the barriers to an open position;

a driving lever rotatably coupled relative to the front panel and including a projection for depressing the barriers to a closed position;

a rotator for converting a linear motion of the barrel into a rotational motion of the driving lever; and a spring bar coupled to the supporting portion to rotate the driving lever in accordance with the rotation of the rotator.

9. The lens cap assembly of claim 8, further comprising a barrier cover is fixed to the front panel and at least partially enclosing the barriers to prevent the barriers from being deviated from an optical axis of the lens barrel, the barrier cover defining an optical path.

10. The lens cap assembly of claim 8, wherein the spring bar includes a free end for biasing the driving lever.

11. The lens cap assembly of claim 8, further comprising a fixing pin for fixing the rotator and the spring bar to the supporting portion.

12. The lens cap assembly of claim 8, wherein the barriers are coupled to the front panel by a hinge.

13. A lens cap assembly for use with a lens barrel assembly of a camera having a lens barrel, the lens cap assembly comprising:

a front panel disposed proximal to a photographic subject, the front panel defining an optical path and including a supporting portion projected toward a film or an image-photographing portion;

at least a pair of barriers disposed adjacent to the front panel for opening and closing the optical path of the front panel;

plural elastic members disposed adjacent to the front panel to bias the barriers to an open position;

a driving lever rotatably coupled relative to the front panel and including a projection for depressing the barriers to a closed position; and a rotator coupled to the supporting portion of the front panel for converting a linear motion of the barrel into a rotational motion of the driving lever, the rotator including an elastic member that is elastically deformable and operably coupled with the driving lever.

14. The lens cap assembly of claim 13, further comprising a barrier cover fixed to the front panel and at least partially enclosing the barriers to prevent the barriers from being deviated from an optical axis of the lens barrel, the barrier cover defining an optical path.

15. The lens cap assembly of claim 13, wherein the barriers are coupled to the front panel by a hinge.

16. A lens cap assembly for use with a lens barrel assembly of a camera having a lens barrel, the lens cap assembly comprising:

a front panel disposed proximal to a photographic subject, the front panel defining an optical path and including a supporting portion projected toward a film or an image-photographing portion;

at least a pair of barriers disposed adjacent to the front panel for opening and closing the optical path of the front panel;

plural elastic members disposed at the front panel to bias the barriers to an open position;

a driving lever rotatably coupled relative to the front panel and including a projection for depressing the barriers to a closed position, the driving lever including an elastic portion; and a rotator contacting the elastic portion of the driving lever to convert a linear motion of the barrel into a rotational motion of the driving lever, the rotator being rotatably coupled to the supporting portion of the front panel.

17. The lens cap assembly of claim 16, further comprising a barrier cover is fixed to the front panel and at least partially enclosing the barriers to prevent the barriers from being deviated from an optical axis of the lens barrel, the barrier cover defining an optical path.

18. The lens cap assembly of claim 16, wherein the barriers are coupled to the front panel by a hinge.

* * * * *